United States Patent [19]

Rapp et al.

[11] Patent Number: 4,911,454

[45] Date of Patent: Mar. 27, 1990

[54] RADIAL SHAFT SEALING RING

[75] Inventors: Hermann Rapp, Moerlenbach; Konrad Mader, Weinheim; Volker Schwarz, Hirschberg, all of Fed. Rep. of Germany

[73] Assignee: Firma Carl Freudenberg, Weinheim/Bergstr., Fed. Rep. of Germany

[21] Appl. No.: 364,566

[22] Filed: Jun. 5, 1989

Related U.S. Application Data

[63] Continuation of Ser. No. 150,833, Feb. 1, 1988, abandoned.

[30] Foreign Application Priority Data

Jun. 6, 1987 [DE] Fed. Rep. of Germany ....... 3720930

[51] Int. Cl.⁴ .............................................. F16J 15/32
[52] U.S. Cl. .................................... 277/152; 277/153; 277/227
[58] Field of Search ................. 277/35, 152, 153, 181, 277/182, 227

[56] References Cited

U.S. PATENT DOCUMENTS

| | | | |
|---|---|---|---|
| 2,208,482 | 7/1940 | Victor | 277/152 X |
| 2,249,141 | 7/1941 | Johnson | 277/152 |
| 2,819,106 | 1/1958 | Voorhees | 277/182 |
| 3,197,217 | 7/1965 | Mastrobattista et al. | 277/153 |
| 4,132,421 | 1/1979 | Corsi et al. | 277/182 X |
| 4,504,068 | 3/1985 | Holzer | 277/182 X |

FOREIGN PATENT DOCUMENTS

| | | | |
|---|---|---|---|
| 161080 | 2/1955 | Austria | 277/153 |
| 832368 | 1/1952 | Fed. Rep. of Germany | 277/153 |
| 3405513 | 4/1985 | Fed. Rep. of Germany | |
| 2095348 | 9/1982 | United Kingdom | 277/153 |

Primary Examiner—Philip R. Coe
Assistant Examiner—Stephen F. Gerrity
Attorney, Agent, or Firm—Felfe & Lynch

[57] ABSTRACT

A radial shaft sealing ring comprises a stiffening ring as well as a sealing lip and an annular seal which are integrally combined by radial connecting sections running through notches in the stiffening ring. The annular seal is mounted in recesses in the stiffening ring, which have an increasing depth radially toward the driving surface.

15 Claims, 2 Drawing Sheets

RADIAL SHAFT SEALING RING

This application is a continuation of application Ser. No. 150,833, filed Feb. 1, 1988, now abandoned.

BACKGROUND OF THE INVENTION

The invention relates to a radial shaft sealing ring which comprises a stiffening ring having an angular profile with a first limb pointing radially inwardly and a second limb extending axially. A sealing lip disposed on the radially inwardly pointing end of the first limb extends substantially parallel to the second limb. An annular seal of rubber elastic material is disposed in recesses on the second limb in the area enveloping the first limb.

Such a radial shaft sealing ring is disclosed in West German Pat. No. 3,405,513. The stiffening ring that is used therein consists of deep-drawn sheet steel, which makes manufacturing expensive and makes it difficult to use automatic tools to install the radial shaft sealing ring when ready for use.

It is an objective of the present invention to devise a radial shaft sealing ring which overcomes these disadvantages of the design described above.

SUMMARY OF THE INVENTION

This objective, as well as other objectives which will become apparent in the discussion that follows, are achieved in the radial shaft sealing ring according to the invention, by providing tee stiffening ring, on its side facing away from the second limb of its L-shaped profile, with notches uniformly distributed around the circumference and open in the axial direction, so that the sealing lip and the annular seal may be joined integrally by connecting portions extending through the notches or recesses. The annular seal and the sealing lip are thus joined substantially more strongly to the stiffening ring. Consequently, under extremely severe assembly conditions, such as those involved for example in automatic assembly tools, separation is no longer a concern.

Also, within the forming die in which the sealing lip and the annular seal are formed and solidified on the stiffening ring, there is achieved a substantially more precise association between the stiffening ring and the die and, thus, the desired position within the completed and ready-to-use radial shaft sealing ring. On the one hand, this achievement simplifies manufacture and, on the other, it improves the properties the sealing ring will have when in use.

The stiffening ring of the radial shaft sealing ring according to the invention consists preferably of a very hard plastic whose elasticity modulus is considerably greater than that of the material forming the sealing lip. Both the sealing lip material and the material of the stiffening ring can be fabricated alternatively by the pressing method and/or by the injection molding method or injection embossing method, the two materials being able also to be fiber-reinforced, which especially in the case of the stiffening ring leads to an improvement of its mechanical strength. The shaping tools or dies used in the forming process permit an accurate, dimensionally precise transition between the too material components in the axial direction on the outside diameter.

The second limb can be provided on the end facing away from the first limb with an axially projecting and substantially annular thrust surface which is shifted radially inwardly with respect to its outer circumferential surface. The thrust surface runs substantially radially, its radial width in the same direction being able to be reduced to a minimum and, in the extreme case, to a surface appearing to be knife-edge-like.

Even in this case the result is a great bearing capacity with regard to the rotationally symmetrical shape of the stiffening ring. Even heavy axial loading which may result, for example, if the seal is forced excessively deep into the bore in the housing, will therefore, as a rule, result in no damage to the stiffening ring. At the same time the area of transition between the circumferential surfaces extending radially and those extending axially in the bore can be more generously proportioned. Thus it is not necessary to turn a sharp edge in this area or to provide at that point a very narrow transitional radius between the two surfaces. Both could be produced only with relatively great difficulty and would be accordingly complicated and expensive.

The thrust surface can be radially interrupted at least at one point on its circumference in order to enable the liquid medium, which in most cases is oil, to penetrate into the area between the outer circumferential surface of the stiffening ring and the circumferential surface of the receiving housing bore confronting it and to achieve the annular seal that produces the static sealing action. This annular seal consists of an elastomeric material and, therefore, if it has the customary qualities, it has a certain ability to swell. This property is utilized to achieve good sealing results and a tight seat in the housing bore, and is desirable when vibrations occur.

The stiffening ring can be provided at the end axially opposite the thrust surface with a substantially annular driving surface which is interrupted by the above-described notches in the stiffening ring regularly distributed around the circumference.

The installation forces needed for pressing the radial shaft sealing ring into its bore in the housing are applied to the driving surface. This driving surface for this reason forms a boundary surface of tee stiffening ring consisting of substantially unyielding material, so that this ring and the entire radial shaft sealing ring with it is associated with the installation tool in an especially precise manner. In the case of automatic assembly, therefore, there is no possibility that some individual radial shaft sealing rings will be driven to different depths than others.

The thrust surface and the driving surface can have approximately the same mean diameter, and it has been found desirable if the interior and exterior circumferential surfaces of the stiffening ring are all at a positive distance from an imaginary cylindrical surface whose diameter is the same as the average diameter of the thrust surface and driving surface. The resistance of the stiffening ring to buckling in the axial direction is thus decidedly improved, especially in cases in which the second limb of its L-shaped profile, extending in the axial direction, has, with the exception of the area of transition to the first limb, a thickness in the radial direction which increases steadily toward the middle of its axial length.

The recesses containing the statically sealing annular seal are filled completely by the annular seal and it is desirable that it have a depth in the radial direction that increases toward the driving surface.

The conical surface thus resulting, which is inclined with respect to the axis of the seal, forms with the seal axis a very low angle of 3° to 15° which, on the one hand, facilitates the axial driving of the radial shaft sealing ring according to the invention into the bore in a housing and, on the other hand, provides the installed radial shaft sealing ring with an especially tight seat in the bore. If an outwardly directed force is exercised in the axial direction on the installed radial shaft sealing ring, this causes a radial squeezing of the annular seal between the above-described conical surface and the housing wall confronting it. Both are completely unyielding, and this fact, combined with the resiliency of the rubber-elastic material forming the annular seal, results in a virtually inseparable bond between the installed radial shaft sealing ring and the bore in the housing.

The recesses can be defined radially inwardly by surface areas uniformly distributed around the circumference at different distances from the seal axis. In addition to an improved ability of the annular seal to yield, which is desirable for the installation procedures, the result of these recesses is an increase in the bonding area between the stiffening ring and the annular seal, which increases the strength of adhesion of the annular seal to the stiffening ring. These areas can be made to merge uniformly with one another and, in this case, form a uniformly wavy surface surrounding the seal axis. Sharp transition zones between the stiffening ring and the annular seal are absent in this case. The danger of the occurrence of separation of the material bodies forming the annular seal and the stiffening ring in the area of projecting or receding corners or edges is thereby definitely reduced.

The recesses can be defined at the end remote from the driving surface by a ramp. This ramp can best form with the seal axis on the side facing the recess an angle (B) of about 90° to 150°, thereby securely avoiding any parting of the annular seal from the carrier ring within the area in question, for example when the seal is pressed into its bore.

The ramp can be uniformly curved into the surface defining the recesses in the radial direction. The strength of adhesion between the areas of the annular seal and stiffening ring which confront one another in this area is thereby increased.

Furthermore, it has been found to be advantageous if the ramp is sharply defined against the external circumferential surface of the stiffening ring. The annular seal subsequently formed on the stiffening ring is thereby precisely defined with respect to the stiffening ring which consists of a different polymeric material, which improves the external appearance and gives the annular seal a high quality appearance.

If a material capable of swelling is used for the production of the annular seal and of the lip seal, it has generally proven sufficient if the outside diameter of the annular seal is substantially the same as the diameter of the outer circumferential surface of the stiffening ring and bore. The necessary contact pressure between the annular seal and the wall of the bore is based in this case on the swelling of the annular seal which results from wetting by the medium that is being sealed. If, however, complete security is not achieved in this regard, due for example to the use of certain high-quality rubber-elastic materials, then it has been found desirable to give the annular seal an outside diameter that is slightly greater than the diameter of the outer circumferential surface of the stiffening ring.

BRIEF DESCRIPTION OF THE DRAWINGS

The subject of the present invention will be further explained below with the aid of the appended drawings.

DESCRIPTION OF THE PREFERRED EMBODIMENTS

Figure 1:
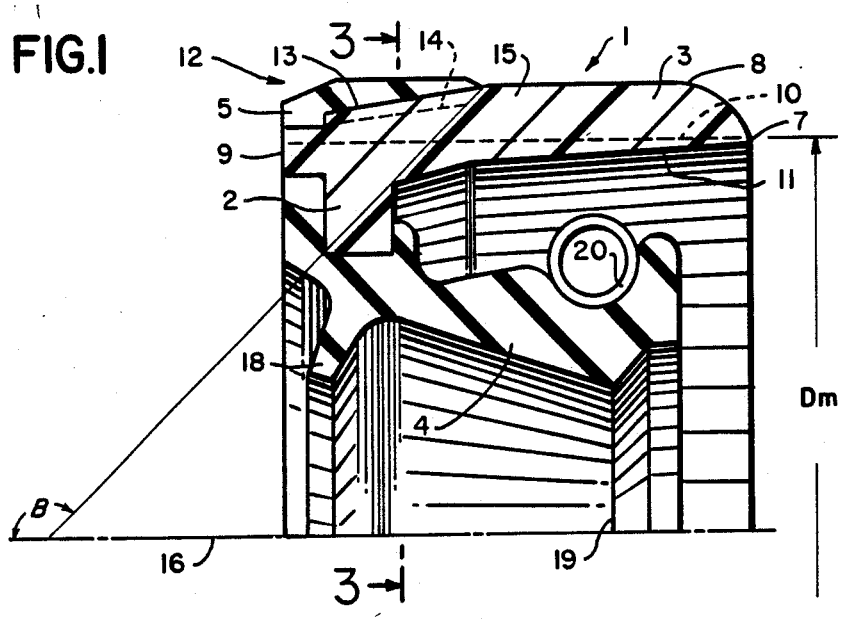
FIG. 1 is a cross-sectional view through half of an exemplary embodiment of the radial shaft sealing ring according to the invention.
Figure 2:
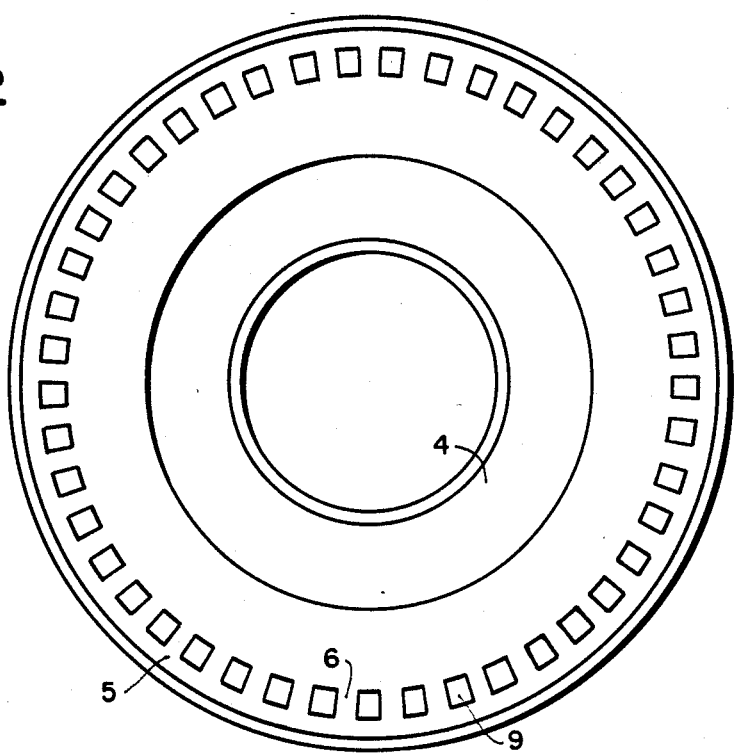
FIG. 2 is an elevational view of the radial shaft sealing ring shown in FIG. 1, as seen from the left.
Figure 3:
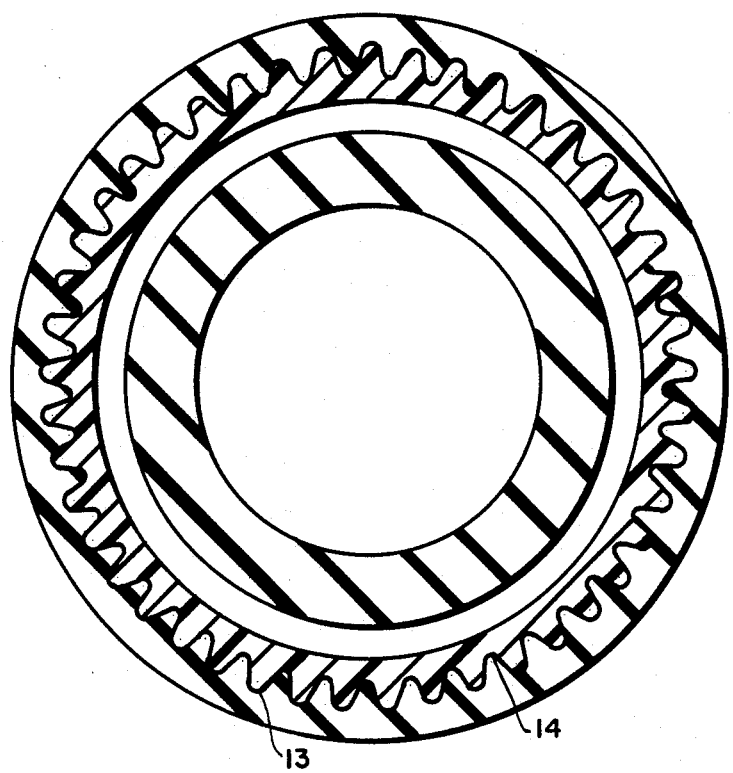
FIG. 3 is a cross-sectional view of the radial shaft sealing ring shown in FIG. 1, taken along the line A—A therein.

The radial shaft sealing ring shown in FIG. 1 consists of a stiffening ring 1 of a hard and tough plastic having an L shaped cross-sectional profile of which a firs limb 2 projects radially inwardly and a second limb 3 projects axially. These two limbs are integral with one another.

The first limb 2 is provided on the side facing away from the second limb with notches uniformly distributed around the circumference and open in the axial direction, through which the connecting sections 6 of the annular seal and the sealing lip pass resulting in a configuration of the two bodies of material in which one merges with the other. The annular seal 5, the connecting sections 6 and the sealing lip 4 consist therefore of a single body of rubber-elastic sealing material.

This body is relatively soft and elastic and is joined to the body forming the stiffening ring 1 by being formed and vulcanized directly on the latter.

The sealing lip 4 has the dust lip 18 integrally formed on it, as well as a sealing edge 19 on the outer side of which an annular coil spring 20 of metal material is provided.

Thus, a uniform urging of the sealing edge 19 against the shaft to be sealed, which is not shown, is assured over long periods of time, and this assures the achievement of a seal which can withstand the severest stresses.

The stiffening ring 1 has at its opposite ends a driving surface 9 and a thrust surface 7. The two have identical mean diameters which are joined together in FIG. 1 by an imaginary cylindrical surface 10. The outer circumferential surface 8 and the inner circumferential surface 11 of the second limb of the L-shaped profile of the stiffening ring are each at a positive distance from the cylindrical surface 10, which provides the axially projecting, second limb 3 of the stiffening ring with an excellent resistance to buckling. The radial shaft sealing ring according to the invention can therefore be installed easily, allowing even a hard abutment against the bottom of the housing bore that receives it. The result is a considerable simplification with regard to the use of automatic installation tools.

The thrust surface 7 is radially offset from the outer circumferential surface 8 of the stiffening ring 1. The transition between the bottom of the housing bore and its circumferential surface can thus be relatively loosely configured.

Thus it is no longer necessary to provide sharp-cornered bores in this area, which are expensive to produce.

The driving surface 9 axially opposite the thrust surface 7 is part of the hard, tough and substantially unyielding stiffening ring 1. In automatically operating installation tools, this assures a precise relationship between the radial shaft sealing ring and the installation tool even while the ring is being pressed in place, and this makes it easier to achieve a precise seat in the bore in the housing.

The second limb 3 of the L-shaped profile has recesses 12 in which the annular seal 5 is disposed. Such recesses are defined inwardly substantially by the surfaces 13 and 14 which are at a varying distance from the seal axis 16 and which merge with one another circumferentially to form waves. Furthermore, the surfaces 13 and 14 as well as the transitions between the latter are inclined at a low angle toward the seal axis 16, so that, when the sealing ring shown in FIG. 1 is pressed axially to the ring into the housing bore, the annular seal 5 of matching profile is able easily to yield in the leftward direction. This simplifies the process of pressing the seal in place. Nevertheless, due to the slightly larger outside diameter of the annular seal 5 with respect to the diameter of the outer circumferential surface 8 of the stiffening ring, the result is a good radial compression of the annular seal 5 between the surfaces enveloping it radially on both sides.

At the end remote from the driving surface, the recesses 12 are terminated by a ramp 15. This ramp forms an angle B of about 90° to 150° with the seal axis on the side facing the recess, thereby securely avoiding any parting of the annular seal from the carrier ring within the area in question when the seal is pressed into its bore.

In addition to a good sealing of the radial shaft sealing ring against the housing bore, this arrangement also achieves a tight seating. Such tight seating is further promoted by the fact that a leftward relative movement of the installed radial shaft sealing ring with respect to the housing bore (FIG. 1) would lead to a extremely high radial compression of the annular seal 5 with respect to the annular surfaces enveloping it internally and externally. The annular seal 5, however, consists of an incompressible material. The nondestructive removal of the installed radial shaft sealing ring is therefor not easily possible, nor is any loosening of the installed radial shaft sealing ring possible as a result of the introduction of vibrations.

There has thus been shown and described a novel radial shaft sealing ring which fulfills all the objects and advantages sought thereafter. Many changes, modifications, variations and other uses and applications of the subject invention will, however, become apparent to those skilled in the art after considering this specification and the accompanying drawings which disclose the preferred embodiment thereof.

All such changes, modifications, variations and other uses and applications which do not depart from the spirit and scope of the invention are deemed to be covered by the invention which is limited only by the claims which follow.

What is claimed is:

1. In a radial shaft sealing ring, comprising (a) a stiffening ring of plastic having an outer circumference and a central axis and being adapted to be arranged coaxially around a shaft to be sealed, said stiffening ring having an angular profile with a first limb pointing radially inwardly and a second limb extending axially from one side of said first limb, wherein the second limb is provided at the end pointing away from the first limb with a substantially annular, axially projecting thrust surface shifted radially inwardly with respect to the outer circumferential surface, and wherein the stiffening ring is provided at the end axially opposite the thrust surface with a driving surface of substantially annular configuration, (b) a sealing lip disposed on the radially inwardly pointed end of the first limb and extending substantially parallel to the second limb, and (c) an annular seal of rubber-elastic material disposed on the periphery of the second limb in the area enveloping the first limb, the improvement wherein the thrust surface and the driving surface of the stiffening ring have approximately the same mean diameter.

2. The radial shaft sealing ring according to claim 1 wherein the material body forming the sealing lip and the annular seal is formed directly on the stiffening ring.

3. The radial shaft sealing ring according to claim 1, wherein the thrust surface is broken through radially at at least one point on its circumference.

4. The radial shaft sealing ring according to claim 1 wherein the driving surface is interrupted by the notches in the stiffening ring.

5. The radial shaft sealing ring according to claim 1, wherein the mean diameter of the thrust surface and of driving surface are joined by an imaginary cylindrical surface, and wherein the second limb between the thrusting surface and the driving surface is continuously defined by outer and inner circumferential surfaces which have a positive distance from the said imaginary cylindrical surface.

6. The radial shaft sealing ring according to claim 5, wherein the second limb, aside from its point of connection to the first limb, has a thickness increasing radially steadily to the middle of its axial length.

7. The radial shaft sealing ring according to claim 1, wherein the recesses have a depth in the radial direction which increases toward the driving surface.

8. The radial shaft sealing ring according to claim 7, wherein the recesses are defined radially inwardly by surface areas distributed uniformly around the circumference, which are at a distance different from one another from the seal axis.

9. The radial shaft sealing ring according to claim 8, wherein said surface areas are configured uniformly merging with one another at least in the circumferential direction.

10. The radial shaft sealing ring according to claim 1, wherein the recesses are defined at the end facing away from the driving surface by an end face ramp.

11. The radial shaft sealing ring according to claim 10, wherein said ramp and said central axis include an angle of 90°–150° on the side of the sealing ring facing the recesses.

12. The radial shaft sealing rig according to claim 11, wherein the recesses are defined radially on the inside by a surface which merges with a uniform curvature with said ramp.

13. The radial shaft sealing ring according to claim 10, wherein said ramp and the external circumferential surface meet one another in a sharp-edged manner.

14. The radial shaft sealing ring according to claim 1, wherein the outside diameter of the annular seal is greater than the diameter of the external circumferential surface of the stiffening ring.

15. The radial shaft sealing ring according to claim 1, wherein said first limb of the stiffening ring is provided on the side facing away from said second limb with notches open in the axial direction and uniformly distributed around its circumference and wherein the sealing lip and the annular seal are joined integrally by continuations penetrating through said notches.

* * * * *

UNITED STATES PATENT AND TRADEMARK OFFICE
CERTIFICATE OF CORRECTION

PATENT NO. : 4,911,454

DATED : March 27, 1990

INVENTOR(S) : Rapp et al.

It is certified that error appears in the above-identified patent and that said Letters Patent is hereby corrected as shown below:

Column 1, line 62, delete "too" and insert -- two --.

Column 4, line 54, delete "thatreceives" and insert
    -- that receives --.

Signed and Sealed this

First Day of September, 1992

*Attest:*

DOUGLAS B. COMER

*Attesting Officer*     Acting Commissioner of Patents and Trademarks